Patented Feb. 13, 1945

2,369,414

UNITED STATES PATENT OFFICE 2,369,414

CONDITIONING OF ORGANIC PIGMENTS

Mario Scalera, Somerville, N. J., assignor to American Cyanamid Company, New York, N. Y., a corporation of Maine No Drawing. Application November 8, 1941, Serial No. 418,867

13 Claims. (Cl. 260—316)

This invention relates to a process of improving the physical form of vat dyestuffs by an acid-pasting method.

Many vat dyestuffs are purified by the so-called acid-pasting method which involves solution of the pigment in sulfuric acid followed by precipitation by an aqueous medium such as an excess of water or dilute sulfuric acid. This is commonly known in the art as acid-pasting, although strictly speaking the expression is a misnomer as actual solution of the pigment in the sulfuric acid takes place. Acid-pasting has commonly been employed with any vat dyestuff soluble in sulfuric acid. Some vat dyes, such as anthrimides, can be subjected to acid-pasting resulting in a chemical change in the pigment by action of the sulfuric acid to produce the final vat dye.

In spite of the desirable features of acid pasting it has been open to some disadvantages. Thus, for example, the filter presscake obtained is of relatively low solids content. The low solids content makes it difficult to prepare dyeing pastes of greater strength as excessive dilution with the water present in the paste results.

According to the present invention it is found that the acid pasting procedure can be greatly improved by carrying out the dilution step in the presence of a water-immiscible neutral organic liquid. In the case of most vat dyestuffs this results in the production of a filter cake of greatly increased solids content. The increase in solids content obtainable by the present invention will vary with different dyestuffs and different solvents, but when the best solvent for any particular dyestuff is used the increase is always considerable and in every case makes a commercially more desirable paste which is not subject to the disadvantage that large amounts of water have to be shipped as in the pastes of the prior art where the solids content after acid-pasting was quite low.

The process of the present invention should not be confused with certain processes in which sulfonated organic compounds have been used in acid pasting in the form of wetting agents which are retained in the pigment and increase its wettability. Such wetting agents are sulfonated alkylated naphthalene, sulfonated dinaphthylmethane, and the like, and they are not water-immiscible organic liquids and hence do not perform the function of the present invention and such procedures are not included.

The present invention is not limited to any particular water-immiscible neutral organic liquid and in general a wide variety of immiscible liquids may be used, some of which are soluble in sulfuric acid and some of which are not. While the invention is not limited broadly to any particular organic liquid, different liquids give varying results with different pigments and in each case the optimum should be chosen. Improved results are generally obtained with any suitable organic liquids. Preferably the amount of organic liquid should be at least 20% of the weight of the pigment.

The present invention is not limited to the introduction of the organic liquid at any particular stage of the acid-pasting. Thus, for example, in the case of organic liquids which are soluble in concentrated sulfuric acid and which are not sulfonated such as nitrobenzene, ethers and the like, they may be added to the sulfuric acid solution prior to dilution. In the case of other organic liquids which are subject to sulfonation it is preferable to disperse the organic liquid with the water or dilute sulfuric acid which is used to precipitate the pigment. Without intending to limit the present invention, some typical organic liquids in addition to nitrobenzene are the following: homologues of benzene such as toluene, xylene, p-cymene, mesitylene, turpentine, "Solvesso #2" (a hydrogenated petroleum product of predominantly aromatic nature), mixed hexanes, esters such as amyl butyrate, diethyl phthalate; ethers such as amyl benzyl ether, diamylether, dibutylether, diphenylether, n-butylphenyl ether; aliphatic halogen compounds such as carbon tetrachloride and symmetrical tetrachloroethane and the like. It will be evident that all of the above enumerated liquids are neutral, that is, they will not react with either acids or bases. Particularly with vat dyestuffs of the anthraquinone series, nitrobenzene appears to be preferable although good results are obtained with toluene, xylene, o-dichlor benzene, and the like.

Typical examples of the pigments which can be treated by the present invention are as follows: various vat dyestuffs of the anthraquinone series such as 1,4-dibenzoyldiamino anthraquinone (C. I. 1131), Calcosol Olive R (C. I. 1150), Calcosol Brown R (C. I. 1151), Calcosol Blue RS (C. I. 1106), Calcosol Blue GCD (C. I. 1113), and other halogenated indanthrenes, Calcosol Yellow G (C. I. 1118), Pyranthrone (C. I. 1096) and its halogen derivatives such as Calcosol Flaming Orange 2R (C. I. 1098) and Calcosol Golden Orange RRTT (C. I. 1097), Calcosol Yellow GC (C. I. 1095), Calcosol Violet BN (C. I. 1163), Calcosol Dark Blue BO (C. I. 1099), and its halogen and nitro derivatives. Iso Violanthrone (C. I. 1103), Calcosol Violet RR (C. I. 1104), Calcosol Jade Green N (C. I. 1101), also indigoid dyestuffs such as Calcosol Orange R (C. I. 1217), and Calcosol Red 3B (C. I. 1212). These vat dyestuffs are given only as examples and the list is, obviously, not complete.

Some of the dyestuffs of the anthrimide series when dissolved in sulfuric acid form new carbazole ring systems through dehydrogenation. Thus, when 4,4' - dibenzoyldiamino - 1,1' - dianthrimide is dissolved in sulfuric acid the positions 3 and 3' are connected to form a carbazole nucleus and the above-mentioned Calcosol Olive R results. The same happens to the 4,5'-dibenzoyldiamino-1,1'-dianthrimide which gives the above mentioned Calcosol Brown R. In cases like this it is possible to dissolve the dianthrimide in sulfuric acid and after the ring closure has been accomplished to dilute the solution with water in the presence of a water non-miscible organic liquid without previously isolating the desired vat dyestuff. The organic liquid may be added before or after the ring closure.

The concentration of the sulfuric acid will vary with the type of dyestuff used. While in the great majority of cases a concentration of over 90% is used, there are a few cases where a lower concentration is better. Thus, the 4,4'-dibenzoyldiamino anthraquinone hydrolyzes too easily in more concentrated sulfuric acid and it is therefore advantageous to use an 85% sulfuric acid in this case.

The amounts of water to be used in the precipitation will also depend upon the individual dyestuffs and will furthermore depend on whether it is desired to perform a purification at the same time as it is e. g. customary with the indanthrenes and it will further depend on whether it is desired to precipitate the dyestuff or pigment as such or as the sulfate. In the latter case it is sometimes advantageous to dilute not with water, but with dilute sulfuric acid.

The invention will be described in greater detail in conjunction with the following examples but it is not limited to the details thereof. The parts are by weight.

Example 1

One part of the carbazole corresponding to 4,5'-dibenzoyldiamino-1,1-dianthrimide was dissolved at room temperature in 10 parts of 68° Bé. sulfuric acid and 1 part of nitrobenzene. The solution was drowned in 100 parts of water under stirring. The precipitated dyestuff was filtered and washed neutral. The wet filter cake was freed from nitrobenzene by means of steam and filtered again.

The resulting presscake contained 37% solids. A similar experiment conducted without nitrobenzene gave a presscake of only 21% solid content; prolonged boiling of the latter presscake in aqueous suspension, filtering and pressing gave an increase to only 22% solid content.

Example 2

One part of the same dyestuff (used in Example 1) was dissolved in 10 parts of 66° Bé. sulfuric acid. The resulting cherry red solution was drowned in a well agitated emulsion of 1 part of nitrobenzene in 100 parts of water. The precipitate was filtered, washed, then freed of nitrobenzene by steam, filtered again.

The resulting filter cake had a solid content of 38%. When toluene was used instead of nitrobenzene, the final press cake contained 33% solids, with xylene 31%, with o-dichlorobenzene 32%. To obtain these effects the organic liquid must be finely dispersed in the precipitating water, i. e. good stirring is essential.

Example 3

One part of the carbazole corresponding to 5,5'-dibenzoyldiamino-1,1'-dianthrimide was dissolved in 10 parts of concentrated sulfuric acid, the solution was drowned in a well stirred emulsion of 1 part nitrobenzene in 100 parts of water. The filter cake was treated as described in Example 2.

It contains 38% of solids. A filter cake of this dyestuff prepared in the absence of nitrobenzene contained only 14.7% solids.

Example 4

One part of 2,8-diphenyl-anthracene (2,1:6,5) dithiazole-6,12-dione was dissolved in 10 parts of concentrated sulfuric acid. The clear solution was drowned in a well agitated emulsion of 1 part nitrobenzene and 100 parts of water, the nitrobenzene was removed with steam, the yellow slurry was filtered and washed.

A presscake resulted containing 43% solid dye as compared to a 22% cake obtained in a normal "acid-pasting" without nitrobenzene.

Example 5

One part of dibenzanthrone was dissolved in 10 parts of concentrated sulfuric acid. The solution was drowned in a water-nitrobenzene emulsion, and the precipitate was treated as described in the preceding example.

The press cake obtained contained 32% real dye. In an experiment conducted without nitrobenzene the dye content of the cake was 23%.

Example 6

One part of 4,5' - dibenzoyldiamino - 1,1'-dianthrimide was dissolved in 10 parts of 66° Bé. sulfuric acid containing 1 part of nitrobenzene. After agitating at room temperature for three hours to effect the ring closure to the carbazole the resulting solution was drowned in 100 parts of water. To this slurry was added 1 part of sodium dichromate and stirring was continued for three hours at 35°. The precipitate was filtered and washed, freed from nitrobenzene by steam and filtered again.

A press cake resulted of 31% solids content, compared to a presscake only 18% in solids when no nitrobenzene was used. Using 0.5 part of nitrobenzene per part of dianthrimide resulted in a press cake of 24% solids; using 0.25 part gave a presscake containing 22% of real dyestuff.

Example 7

One part of 4,4' - dibenzoyldiamino - 1,1' - dianthrimide and 0.5 parts of nitrobenzene were dissolved in 10 parts of 66° Bé. sulfuric acid. After stirring for three hours at 30–35° to effect the carbazole ring closure the solution was drowned in 100 parts of water containing 1 part of sodium dichromate; the slurry was stirred at 35° for two to three hours, the precipitate filtered and washed. The filter cake was reslurried in water and treated with steam to remove the nitrobenzene.

On filtering, a presscake of 36% real dyestuff resulted. This compared to the 24% presscake obtained without nitrobenzene.

Example 8

Two parts of 4,4'-dibenzoyldiaminoanthraquinone and 1 part of nitrobenzene were dissolved in 30 parts of 85% sulfuric acid. The resulting solution was drowned in 250 parts of water, the precipitate filtered and washed. The cake was freed from nitrobenzene by steam distillation and filtered again.

The resulting presscake contained 42.6% dyestuff while the presscake obtained by an ordinary "acid-pasting" contained only 16% of solids.

Example 9

To 195 parts of 98% $H_2SO_4$), were added 10 parts of symmetrical tetrachloroethane. The chloro compound did not dissolve in the acid even after stirring. The mixture was then cooled to 15–20° and, with stirring, 25 parts of 4,4'-dibenzamido-1,1'-dianthrimid slowly added. The temperature was kept below 20° by external cooling. After all the dianthrimid had been added, the temperature was held at 20–25° for 3 hours. The reaction product was then drowned in 2 parts of water, the temperature being kept below 25°. 10 parts of sodium dichromate were added and the temperature held at 25° for 2 hours. The dye was filtered off, washed neutral, and stripped for one hour, again filtered and pressed dry. The resulting presscake had a solids content of 32%, as compared to 20–25% solids when prepared without the organic solvent.

I claim:

1. A process of producing presscakes of vat pigments having an enhanced solids content which comprises dissolving the pigment in strong sulfuric acid, diluting the same with an aqueous medium in the presence of an amount of water-immiscible neutral organic liquid at least 20% the weight of the pigment, and removing the liquid by physical means.

2. A process of producing presscakes of vat pigments of the anthraquinone series having an enhanced solids content which comprises dissolving the pigment in strong sulfuric acid, diluting the same with an aqueous medium in the presence of an amount of water-immiscible neutral organic liquid at least 20% the weight of the pigment, and removing the liquid by physical means.

3. A process of preparing a carbazole pigment in the form of a presscake having an enhanced solids content which comprises dissolving an $\alpha,\alpha'$-dibenzoyl diamino-1,1'-dianthrimide in concentrated sulfuric acid and precipitating by dilution with an aqueous medium in the presence of a water-immiscible neutral organic liquid at least 20% of the weight of the pigment, and removing the liquid by physical means.

4. A process of preparing a carbazole pigment in the form of a presscake having an enhanced solids content which comprises dissolving an $\alpha,\alpha'$-dibenzoyl diamino 1,1'-dianthrimide in concentrated sulfuric acid precipitating by dilution with an aqueous medium in the presence of an amount of a water-immiscible neutral organic liquid at least 20% of the weight of the pigment, and removing the liquid by physical means.

5. A process according to claim 1 in which the organic liquid is nitrobenzene.

6. A process according to claim 2 in which the organic liquid is nitrobenzene.

7. A process according to claim 3 in which the organic liquid is nitrobenzene.

8. A process according to claim 4 in which the organic liquid is nitrobenzene.

9. A process according to claim 1 in which the organic liquid is xylene.

10. A process according to claim 2 in which the organic liquid is xylene.

11. A process according to claim 3 in which the organic liquid is xylene.

12. A process according to claim 4 in which the organic liquid is xylene.

13. A process of producing presscakes of vat dyestuffs having an enhanced solids content which comprises dissolving the pigment in strong sulfuric acid, diluting the same with an aqueous medium in the presence of a water-immiscible neutral organic liquid at least 20% of the weight of the pigment, and removing the liquid by steam distillation.

MARIO SCALERA.